US010427570B2

(12) United States Patent
Haby et al.

(10) Patent No.: US 10,427,570 B2
(45) Date of Patent: Oct. 1, 2019

(54) SEAT ASSEMBLY HAVING A SHELL DISPOSED ON A SEAT BACK FRAME

(71) Applicant: Lear Corporation, Southfield, MI (US)

(72) Inventors: Axel Haby, Wolfsburg (DE); Stefan Koehler, Boeblingen (DE)

(73) Assignee: Lear Corporation, Southfield, MI (US)

( * ) Notice: Subject to any disclaimer, the term of this patent is extended or adjusted under 35 U.S.C. 154(b) by 79 days.

(21) Appl. No.: 15/898,039

(22) Filed: Feb. 15, 2018

(65) Prior Publication Data

US 2018/0319301 A1 Nov. 8, 2018

(30) Foreign Application Priority Data

May 5, 2017 (DE) .......................... 10 2017 207 622

(51) Int. Cl.
| | |
|---|---|
| *B60N 2/68* | (2006.01) |
| *B60N 2/90* | (2018.01) |
| *B60N 2/80* | (2018.01) |
| *B60N 2/20* | (2006.01) |
| *B60N 2/60* | (2006.01) |
| *B61D 33/00* | (2006.01) |
| *B60N 2/58* | (2006.01) |

(52) U.S. Cl.
CPC ............... *B60N 2/686* (2013.01); *B60N 2/20* (2013.01); *B60N 2/6009* (2013.01); *B60N 2/80* (2018.02); *B60N 2/914* (2018.02); *B60N 2/99* (2018.02); *B60N 2/58* (2013.01); *B60N 2/68* (2013.01); *B60N 2/682* (2013.01); *B61D 33/0014* (2013.01); *B61D 33/0092* (2013.01)

(58) Field of Classification Search
CPC .......... B60N 2/68; B60N 2/682; B60N 2/686; B61D 33/0014; B61D 33/0092
USPC ......................................... 297/452.18, 440.2
See application file for complete search history.

(56) References Cited

U.S. PATENT DOCUMENTS

| | | | |
|---|---|---|---|
| 5,882,075 A | 3/1999 | Partington et al. | |
| 6,199,252 B1 | 3/2001 | Masters et al. | |
| 8,857,908 B2 | 10/2014 | Brncick et al. | |
| 9,649,963 B2 * | 5/2017 | Line ......................... | B60N 2/64 |
| 10,081,282 B2 * | 9/2018 | Line ......................... | B60N 2/80 |
| 10,220,733 B2 * | 3/2019 | Matsushima ............ | B60N 2/68 |

* cited by examiner

*Primary Examiner* — Syed A Islam
(74) *Attorney, Agent, or Firm* — Brooks Kushman P.C.

(57) ABSTRACT

A seat assembly having a seat back that has a seat back frame and a shell. The seat back frame may extend through a shell opening such that an upper shell cross member is disposed on a back side of the seat back frame and a lower shell cross member may be disposed on a front side of the seat back frame.

20 Claims, 6 Drawing Sheets

SEAT ASSEMBLY HAVING A SHELL DISPOSED ON A SEAT BACK FRAME

TECHNICAL FIELD

This disclosure relates to a seat assembly having a shell that may be disposed on a seat back frame.

BACKGROUND

A seat having a comfort shell is disclosed in U.S. Pat. No. 8,857,908.

SUMMARY

In at least one embodiment, a seat assembly is provided. The seat assembly may have a seat back that may include a seat back frame and a shell. The seat back frame may include first and second side members that extend from an upper cross member to a lower cross member. The shell may have first and second shell side members that extend from an upper shell cross member to a lower shell cross member to define a shell opening. The seat back frame may extend through the shell opening such that the upper shell cross member is disposed on a back side of the upper cross member and the lower shell cross member is disposed on a front side of the lower cross member. The front side may be disposed opposite the back side.

In at least one embodiment, a seat assembly is provided. The seat assembly may include a seat bottom and a seat back. The seat back may be rotatable about an axis with respect to the seat bottom. The seat back may have a seat back frame and a shell. The seat back frame may include first and second side members that extend from an upper cross member to a lower cross member. The shell may have first and second shell side members that extend from an upper shell cross member to a lower shell cross member to define a shell opening. The lower shell cross member may be disposed above the axis. The seat back frame may extend through the shell opening such that the upper shell cross member is disposed on a back side of the upper cross member and the lower shell cross member is disposed on a front side of the lower cross member.

In at least one embodiment, a seat assembly is provided. The seat assembly may include a seat back. The seat back may have a seat back frame, a shell, a side bolster flap, and an inflatable bladder. The shell may encircle the seat back frame. The shell may have a shell opening through which the seat back frame extends. The side bolster flap may be pivotally disposed on the shell. The inflatable bladder may be disposed between the shell and the side bolster flap. The side bolster flap may pivot with respect to the shell and the seat back frame when the inflatable bladder is inflated.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
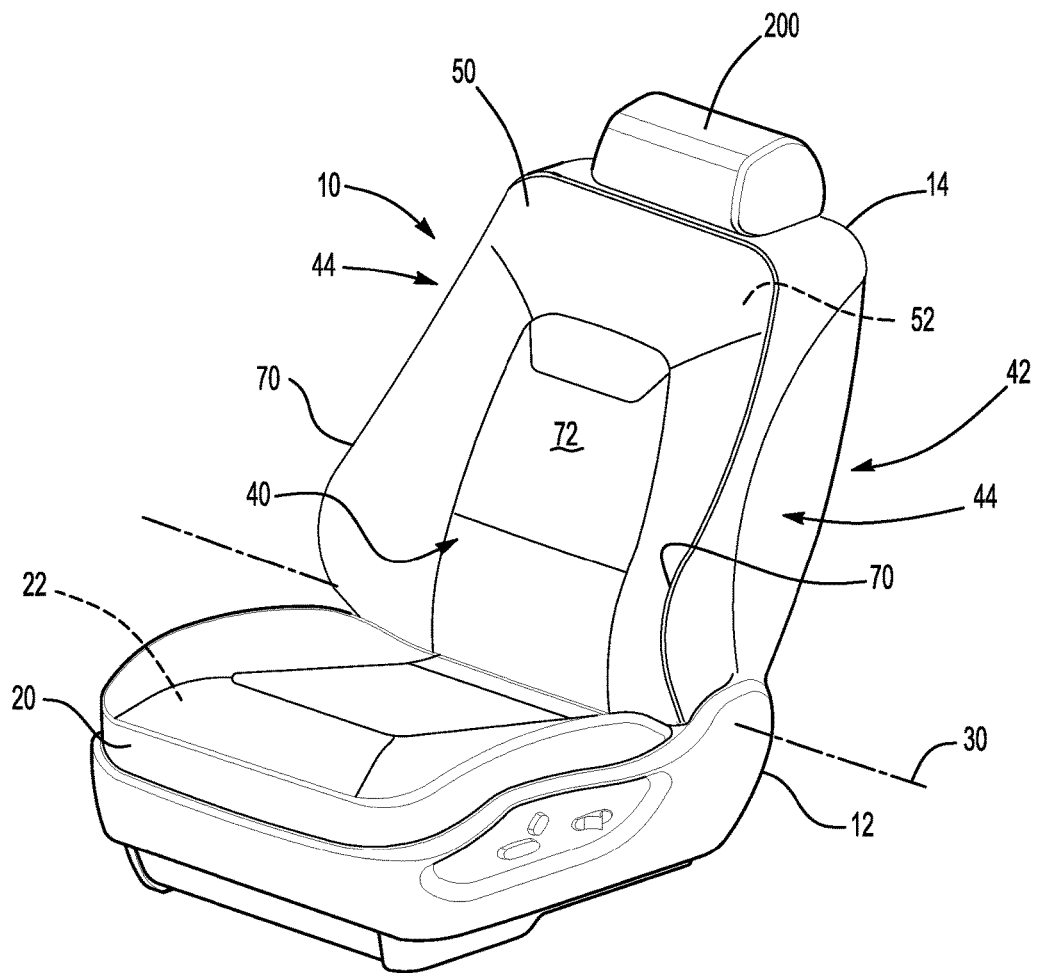
FIG. 1 is a perspective view of a seat assembly having a seat bottom and a seat back.

Referring to FIG. 1, an example of a seat assembly 10 is shown. The seat assembly 10 may be configured for use in vehicular and/or non-vehicular applications. Vehicular applications may include land vehicles, such as cars or trucks, and non-land vehicles, such as aircraft or marine vessels. Non-vehicular applications may include home or office furniture, such as chairs or the like. The seat assembly 10 may include a seat bottom 12 and a seat back 14.

Referring to FIG. 1, the seat bottom 12 may be configured to support a seat occupant. In a vehicular application, the seat bottom 12 may be mounted to a support surface, such as a vehicle floor. The seat bottom 12 may include a support structure, such as a seat bottom frame, seat pan, and/or support wires that may support and facilitate mounting of components of the seat assembly 10. The seat bottom 12 may also include seat bottom trim cover 20 and a seat bottom cushion 22.

The seat bottom trim cover 20 may be disposed over or upon the seat bottom cushion 22 and may form or provide at least a portion of a visible exterior surface of the seat bottom 12. Moreover, a seat occupant may be disposed on the seat bottom trim cover 20 when in a seated position. The seat bottom trim cover 20 may include a plurality of trim panels that may be assembled in any suitable manner, such as by stitching. In addition, the seat bottom trim cover 20 may be made of any suitable material or materials, such as fabric, leather, vinyl, carpet, or combinations thereof.

The seat bottom cushion 22 may be at least partially concealed by the seat bottom trim cover 20 and may be directly or indirectly supported by the support structure of the seat bottom 12. The seat bottom cushion 22 may be made of any suitable material, such as foam.

Figure 2:
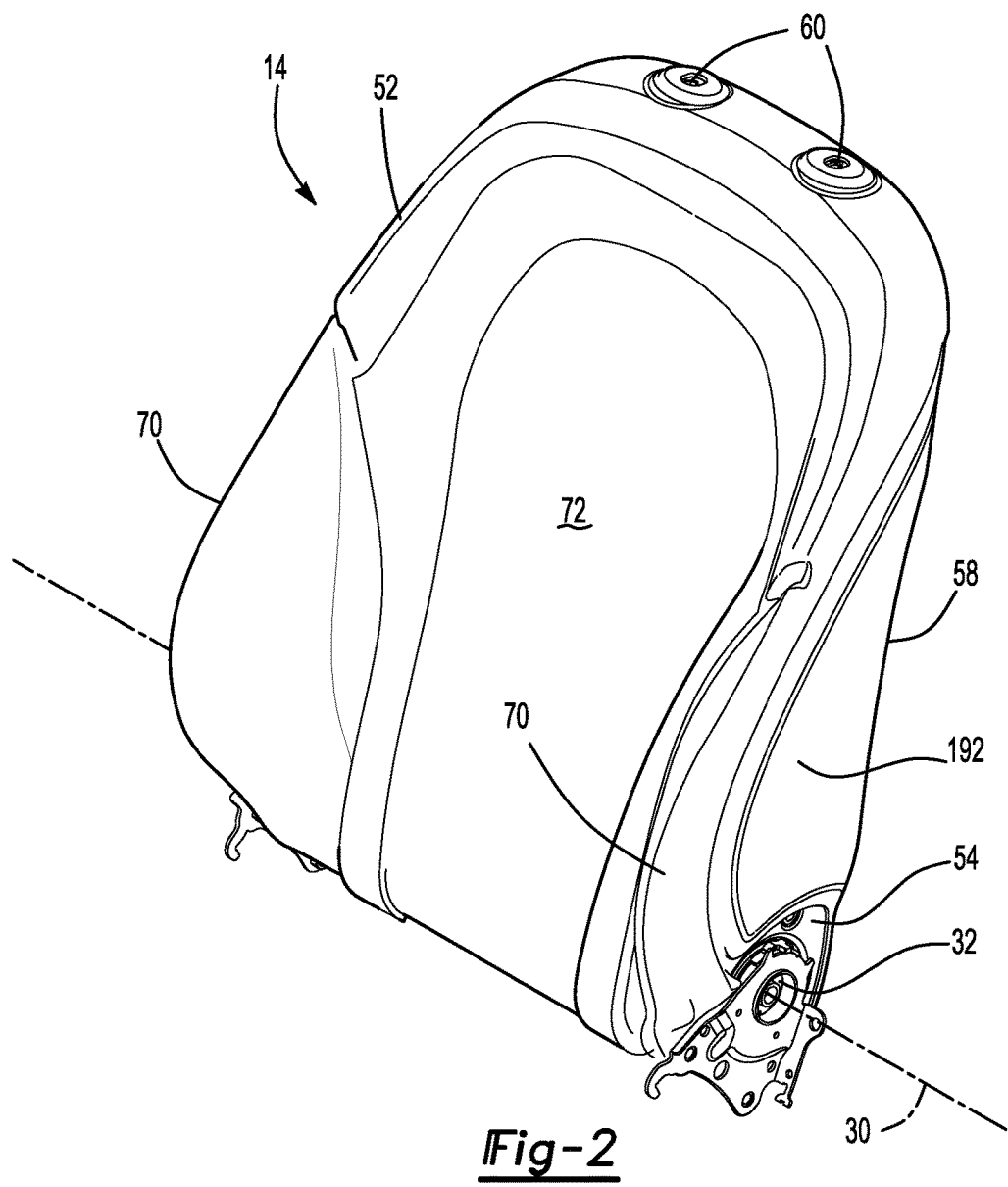
FIG. 2 is a perspective view of a portion of the seat back without a seat back trim cover and a headrest.
Figure 3:
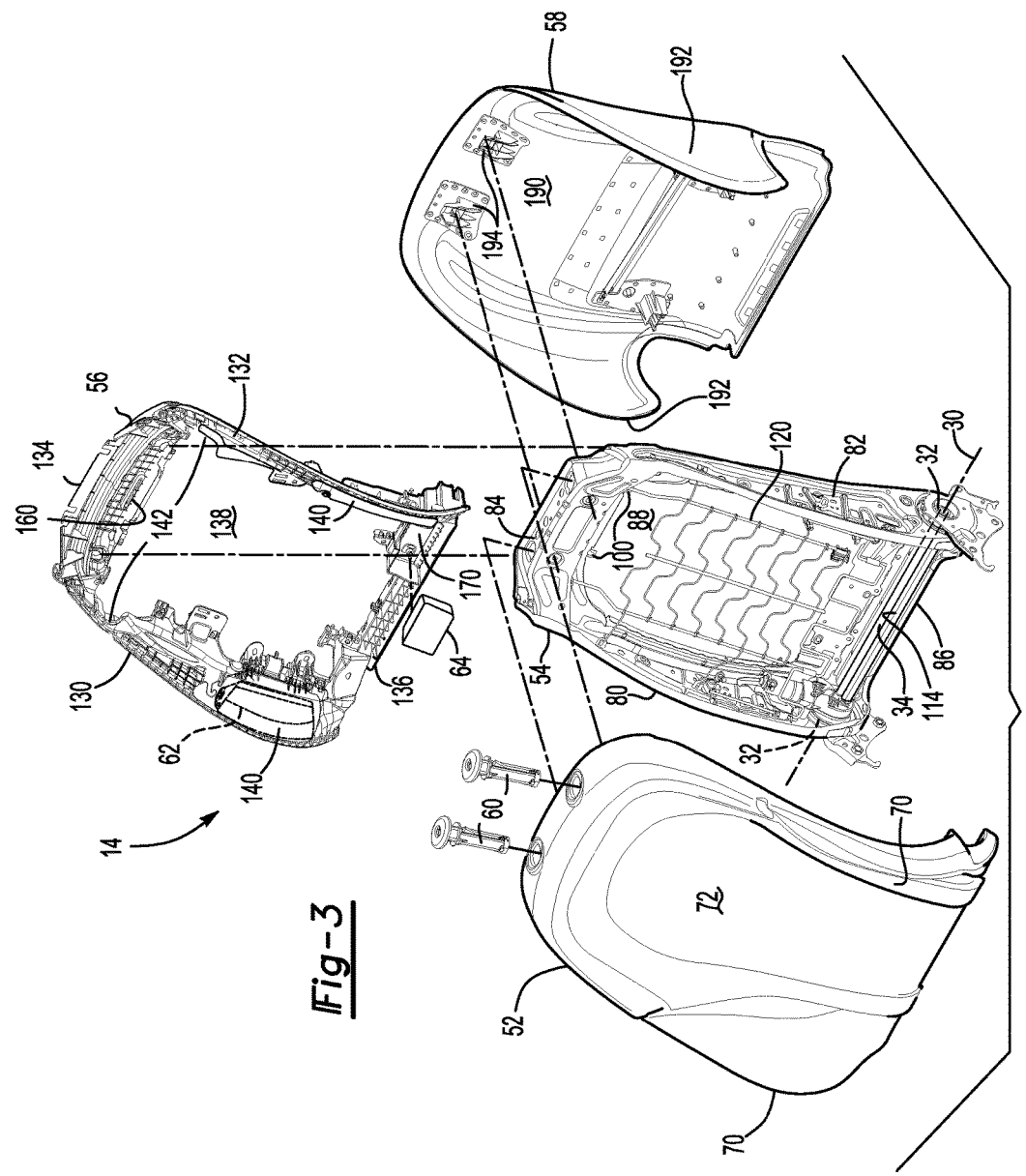
FIG. 3 is an exploded view of the portion of the seat back shown in FIG. 2.

Referring to FIGS. 1-3, the seat back 14 may be configured to support the back of a seat occupant. The seat back 14 may be pivotal about an axis 30 with respect to the seat bottom 12. For example, a pair of recliner mechanisms 32 may pivotally connect the seat back 14 to the seat bottom 12 as is best shown in FIG. 3. A synchronization rod 34 may extend along the axis 30 between the recliner mechanisms 32 to synchronize operation of the recliner mechanisms 32 in a manner known by those skilled in the art. Referring to FIG. 1, for reference purposes the side of the seat back 14 or side of components of the seat back 14 that face in a forward direction or toward a seat occupant may be referred to at a front side 40. A back side 42 may be disposed opposite the front side 40. The side closest to the seat bottom 12 when the seat back 14 is not folded over the seat bottom 12 or is in a nominal seating position as shown in FIG. 1 may be referred to as a bottom side. A top side may be disposed opposite the bottom side. The left and right sides or sides that may extend between the front side 40 and the back side 42 and that may extend between the top and bottom sides may be referred to as lateral sides 44.

Referring to FIGS. 1 and 2, the seat back 14 may include a seat back trim cover 50, a seat back cushion 52, a seat back frame 54, a shell 56, a back panel 58, one or more headrest guide sleeves 60, one or more inflatable bladders 62, and a pressurized gas source 64.

Referring to FIG. 1, the seat back trim cover 50 may be disposed over or upon the seat back cushion 52 and may form or provide at least a portion of a visible exterior surface of the seat back 14. The seat back trim cover 50 may include a plurality of trim panels that may be assembled in any suitable manner, such as by stitching. In addition, the seat back trim cover 50 may be made of any suitable material or materials, such as fabric, leather, vinyl, carpet, or combinations thereof.

Referring to FIGS. 1 and 2, seat back cushion 52 may be at least partially concealed by the seat back trim cover 50 and may be supported by the seat back frame 54 and the shell 56. The seat back cushion 52 may be made of any suitable material, such as foam.

Referring to FIGS. 2 and 3, an example of a seat back cushion 52 is shown in more detail. The seat back cushion 52 is shown without the seat back trim cover 50 to more clearly show the seat back cushion 52 and other components of the seat assembly 10. The seat back cushion 52 may be disposed on a front side of the seat back 14 with respect to the seat back frame 54. The seat back cushion 52 may include or help define a pair of side bolsters 70 and a center seating region 72.

The side bolsters 70 may generally extend along opposing lateral sides of the seat back 14 and may extend between the top side and bottom side of the seat back cushion 52. As such, the side bolsters 70 may be disposed along opposite sides of the center seating region 72 and may extend outwardly or forwardly from the center seating region 72 toward a seat occupant.

The center seating region 72 may be configured to support the back of a seat occupant. The center seating region 72 may be disposed between the side bolsters 70 and may extend between the top and bottom of the seat back cushion 52.

Referring to FIGS. 3-6, the seat back frame 54 may provide structural support for the seat back 14. The seat back frame 54 may be made of any suitable material. For example, the seat back frame 54 may be made of a metal or metal alloy. In at least one configuration, the seat back frame 54 may include a first side member 80, a second side member 82, an upper cross member 84, a lower cross member 86, and a seat back frame opening 88.

The first side member 80 and the second side member 82 may be spaced apart from each other and may generally extend away from the seat bottom 12 along opposing lateral sides of the seat back 14. As such, the first side member 80 and the second side member 82 may be disposed substantially parallel to each other. In addition, the first side member 80 and the second side member 82 may extend from the lower cross member 86 to the upper cross member 84. The first side member 80 and the second side member 82 may be tapered such that the first side member 80 and the second side member 82 become narrower in a direction that extends toward the top of the seat back 14 or in a direction that extends from the lower cross member 86 to the upper cross member 84 when viewed from a lateral side. The first side member 80 and the second side member 82 may be integrally formed with the upper cross member 84, the lower cross member 86, or both. Alternatively, the first side member 80 and the second side member 82 may be provided as separate components from the upper cross member 84 and the lower cross member 86. A side member that is not integrally formed with a cross member may be attached to a side member in any suitable manner, such as by welding or with fasteners.

Figure 5:
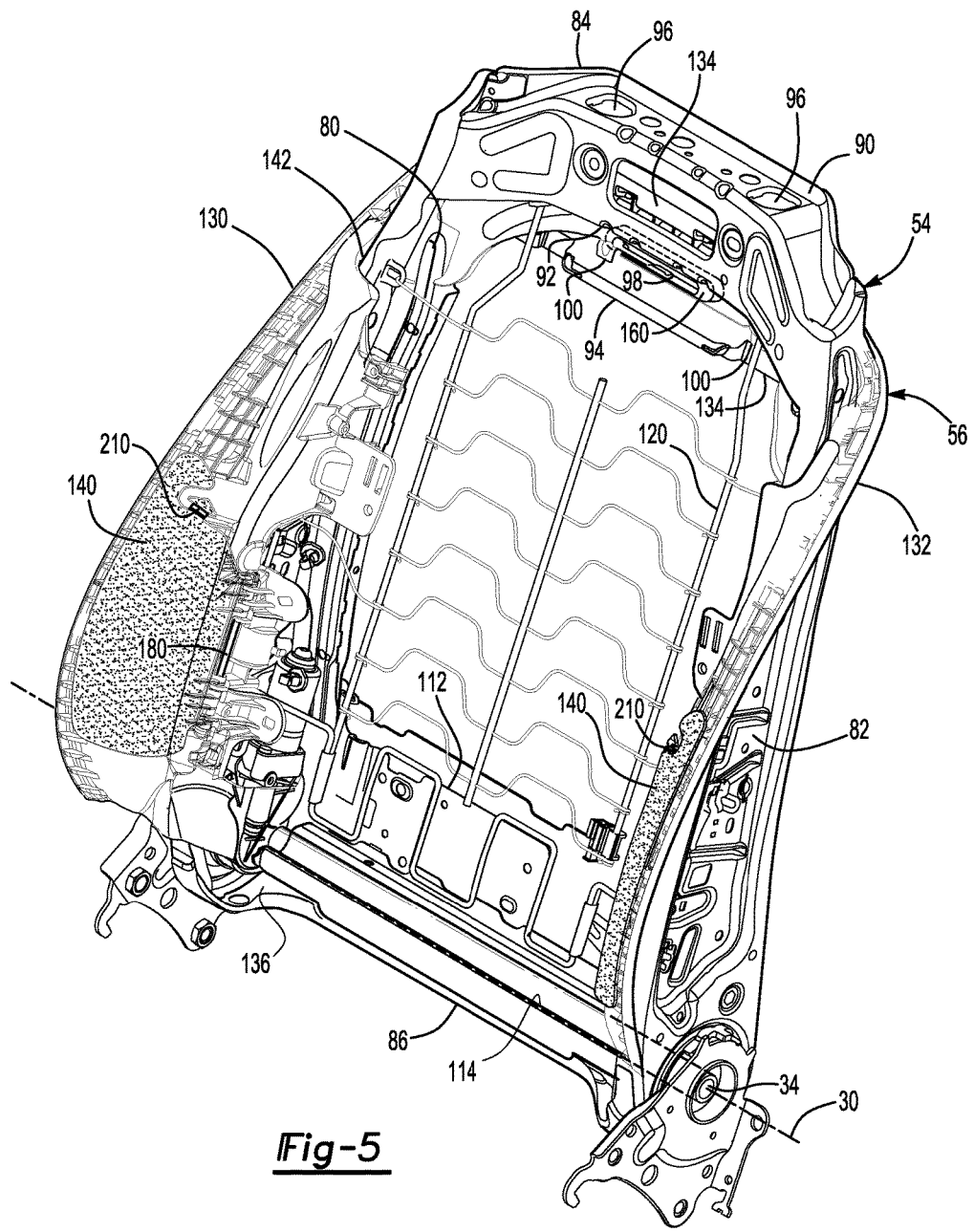
FIGS. 5 and 6 are perspective views of a seat back frame and a shell of the seat back.

Referring to FIG. 5, the upper cross member 84 may be disposed proximate the top of the seat back 14. The upper cross member 84 may extend from the first side member 80 to the second side member 82. As such, the upper cross member 84 may extend in a generally horizontal direction. The upper cross member 84 may include an upper wall 90, a lower wall 92, a back wall 94, one or more guide sleeve openings 96, one or more shell engagement features 98.

The upper wall 90 may face away from the lower cross member 86 and may be disposed at the top of the seat back frame 54. The upper wall 90 may extend over an upper shell cross member of the shell 56 and may receive one or more headrest guide sleeves 60 as will be discussed in more detail below.

The lower wall 92 may be disposed opposite the upper wall 90. For example, the lower wall 92 may face toward the lower cross member 86. The lower wall 92 may be spaced apart from the upper wall 90 in one or more embodiments.

The back wall 94 may be disposed proximate and may engage the back panel 58. In the configuration shown, the back wall 94 extends from the lower wall 92 in a downward direction toward the lower cross member 86. One or more mounting tabs 100 may extend from the back wall 94 to facilitate mounting of the shell 56 and/or the back panel 58 to the seat back frame 54. In the configuration shown, two mounting tabs 100 are provided. The mounting tabs 100 may be spaced apart from each other and may extend in a downward direction toward the lower cross member 86 in one or more embodiments.

One or more guide sleeve openings 96 may be provided in the upper cross member 84. In the configuration shown, two guide sleeve openings 96 are provided. The guide sleeve openings 96 may be provided in the upper wall 90, the lower wall 92, or both. A guide sleeve opening 96 may receive a headrest guide sleeve 60.

One or more shell engagement features 98 may be provided with the upper cross member 84. A shell engagement feature 98 may help position the shell 56 in one or more directions with respect to the seat back frame 54 as will be discussed in more detail below. The shell engagement feature 98 may be provided in any suitable location. For example, the shell engagement feature 98 may be provided in the back wall 94 and may be positioned between the guide sleeve openings 96. In the configuration shown in FIGS. 4 and 5, a shell engagement feature 98 is shown that is configured as an elongated slot that it may extend in a generally horizontal direction and may be disposed between the mounting tabs 100.

Figure 4:
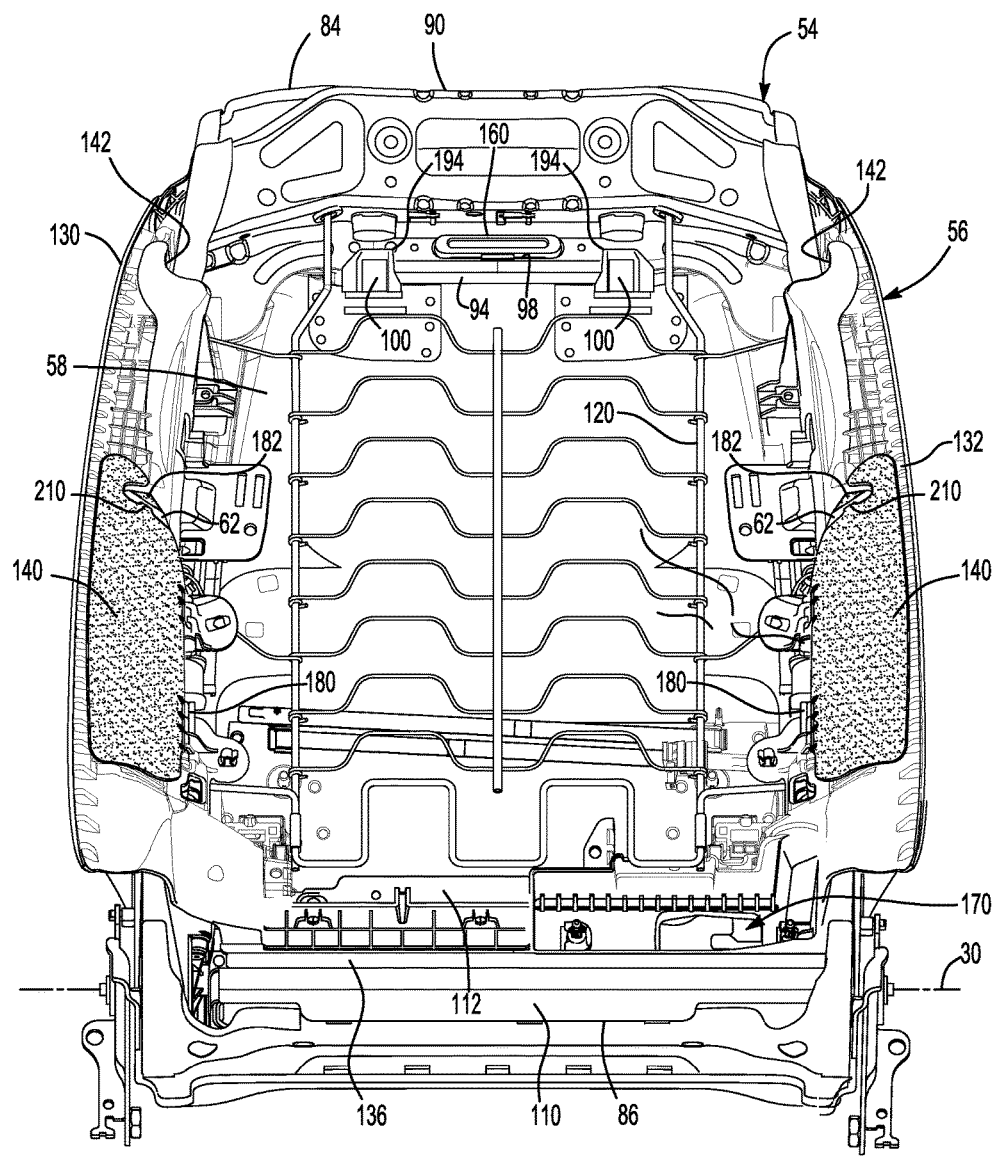
FIG. 4 is a front view of the portion of the seat back shown in FIG. 2 without a seat back cushion.

Referring to FIGS. 4 and 5, the lower cross member 86 may be disposed proximate the bottom of the seat back 14. The lower cross member 86 may be disposed opposite the upper cross member 84 and extend from the first side member 80 to the second side member 82. As such, the lower cross member 86 may extend in a generally horizontal direction. In at least one configuration, the lower cross member 86 may include a tubular portion 110 and a rear wall 112.

The tubular portion 110 may extend from the first side member 80 to the second side member 82. The tubular portion 110 may be at least partially disposed below the axis 30 and may have a hollow configuration. As is best shown in FIG. 5, the tubular portion 110 may include a channel 114 that may be disposed adjacent to and may at least partially receive the synchronization rod 34.

Figure 6:
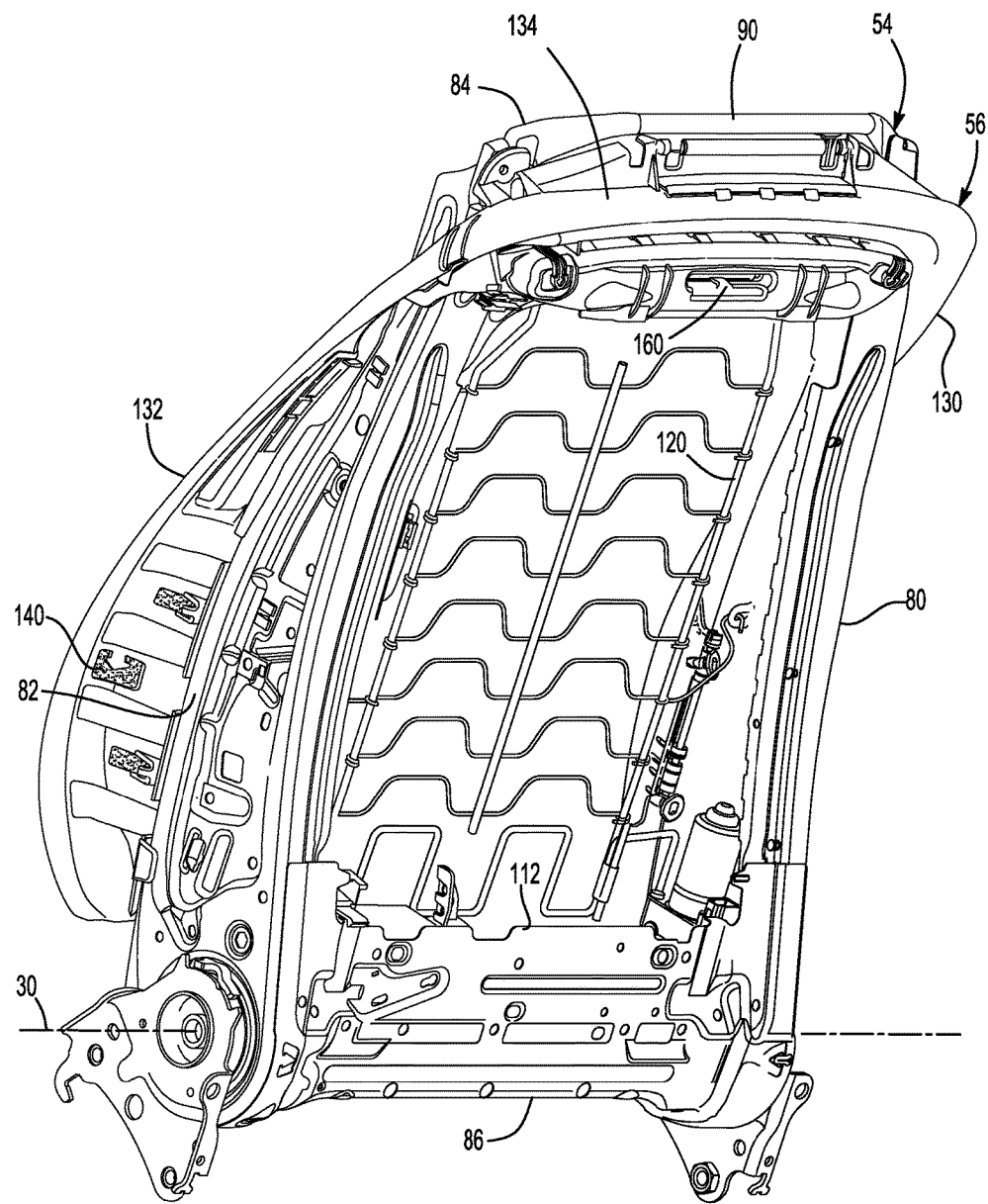

Referring to FIGS. 5 and 6, the rear wall 112 may extend from the tubular portion 110 toward the upper cross member 84. In addition, the rear wall 112 may extend from the first side member 80 to the second side member 82.

Referring to FIG. 3, the seat back frame opening 88 may be defined by and may be disposed between the first side member 80, second side member 82, upper cross member 84, and the lower cross member 86. As is best shown in FIGS. 3, 5 and 6, a suspension mat 120 may be disposed in the seat back frame opening 88. The suspension mat 120 may be a wire frame that may be secured to the seat back frame 54. For example, the suspension mat 120 may be secured to the first side member 80, second side member 82, and the upper cross member 84. The suspension mat 120 may engage and may support the seat back cushion 52.

Referring to FIGS. 3-5, the shell 56 may be disposed on the seat back frame 54. In at least one configuration, the shell 56 may include a first shell side member 130, a second shell side member 132, an upper shell cross member 134, a lower shell cross member 136, and a shell opening 138. In addition, one or more side bolster flaps 140 may be pivotally mounted to the shell 56.

The first shell side member 130 and the second shell side member 132 may be spaced apart from each other and may generally extend away from the seat bottom 12 along opposing lateral sides of the seat back 14. The first shell side member 130 and the second shell side member 132 may extend from the lower shell cross member 136 to the upper shell cross member 134. As such, the first shell side member 130 and the second shell side member 132 may at least partially define first and second side bolsters of the seat back 14 and may support the side bolster portions of the seat back cushion 52. In addition, the first shell side member 130 and the second shell side member 132 may be integrally formed with the upper shell cross member 134, the lower shell cross member 136, or both. In the configuration shown, the first shell side member 130 and the second shell side member 132 are integrally formed with the upper shell cross member 134 and the lower shell cross member 136, thereby providing a unitary one-piece construction. Alternatively, the first shell side member 130 and the second shell side member 132 may be provided as separate components from the upper shell cross member 134 and the lower shell cross member 136. The shell 56 may be made of any suitable material, such as a polymeric material. As such, the shell 56 may be made of a different material than the seat back frame 54.

The first shell side member 130 and the second shell side member 132 may each have a frame receiving pocket 142. The frame receiving pocket 142 on the first shell side member 130 may receive the first side member 80 while the frame receiving pocket 142 on the second shell side member 132 may receive the second side member 82. The frame receiving pockets 142 may be open in a direction that faces toward the center of the seat back 14. In addition, the frame receiving pockets 142 may have a profile that may mate with the tapered configuration of the first side member 80 and the second side member 82. As such, the frame receiving pockets 142 may be tapered and may be narrower near the upper shell cross member 134 than near the lower shell cross member 136. The mating tapered configurations may help position the shell 56 on the seat back frame 54 and may limit the distance the shell 56 can slide down the first side member 80 and the second side member 82 toward the seat bottom 12.

The upper shell cross member 134 may be disposed near the top of the seat back 14. The upper shell cross member 134 may extend from the first shell side member 130 to the second shell side member 132. As such, the upper shell cross member 134 may extend in a generally horizontal direction. As is best shown in FIGS. 5 and 6, the upper shell cross member 134 may be disposed behind the upper cross member 84 or on the back side of the upper cross member 84 of the seat back frame 54. For example, the upper shell cross member 134 may be disposed on the back side of the upper cross member 84. As such, the upper shell cross member 134 may be disposed between the seat back frame 54 and the back panel 58 and may extend from the back side of the upper cross member 84 to the back panel 58. As is best shown in FIG. 6, the upper wall 90 of the upper cross member 84 may extend over the upper shell cross member 134.

Referring to FIGS. 3-6, the upper shell cross member 134 may include one or more mounting features 160. A mounting feature 160 may facilitate mounting and alignment of the shell 56 to the seat back frame 54. A mounting feature 160 may be configured to mate with a corresponding shell engagement feature 98 of the seat back frame 54. In FIG. 5, a mounting feature 160 is shown that extends through the upper cross member 84 and mates with the shell engagement feature 98 of the upper cross member 84. The mounting feature 160 may mate with the shell engagement feature 98 to inhibit movement of the shell 56 in a lateral direction and in a vertical direction.

Referring to FIGS. 3-5, the lower shell cross member 136 may be disposed proximate the bottom of the shell 56. The lower shell cross member 136 may be disposed opposite the upper shell cross member 134 and extend from the first shell side member 130 to the second shell side member 132. As such, the lower shell cross member 136 may extend in a generally horizontal direction. As is best shown in FIG. 4, the lower shell cross member 136 may be disposed above the axis 30 and the tubular portion 110. The lower shell cross member 136 may be disposed in front of at least a portion of the lower cross member 86 or on the front side of the lower cross member 86 of the seat back frame 54. For instance, the lower shell cross member 136 may be disposed in front of the rear wall 112 of the lower cross member 86 as is best shown in FIG. 5. As such, the lower shell cross member 136 may be disposed between the seat back cushion 52 and the rear wall 112 and may be disposed on an opposite side of the seat back frame 54 from the upper shell cross member 134. Thus, the lower cross member 86 may be disposed behind the lower shell cross member 136 and may be disposed between the lower shell cross member 136 and the back panel 58. Moreover, the lower shell cross member 136 may be disposed between the seat back frame 54 and the seat back cushion 52 or between the seat back frame 54 and the suspension mat 120. In at least one configuration, the lower cross member 86 may include or define a mounting cavity 170.

Referring to FIGS. 3 and 5, the mounting cavity 170 may receive and may facilitate mounting of the pressurized gas source 64. The mounting cavity 170 may be disposed above the axis 30 and above the tubular portion 110 of the lower cross member 86 of the seat back frame 54. The mounting cavity 170 may be open in a direction that faces toward the seat back cushion and the suspension mat 120.

Referring to FIG. 3, the shell opening 138 may be defined by and may be disposed between the first shell side member 130, second shell side member 132, upper shell cross member 134, and the lower shell cross member 136. The shell opening 138 may encircle or extend around the seat back frame 54 such that the seat back frame 54 is disposed inside and extends through the shell opening 138. As such, the shell opening 138 may receive the seat back frame 54 such that the seat back frame 54 extends through the shell opening 138. For example, the first shell side member 130 may be disposed on the first side member 80 of the seat back frame 54 such that the first shell side member 130 is disposed laterally outboard from the first side member 80. Accordingly, at least a portion of the first shell side member 130 is disposed opposite the seat back frame opening 88 and the first shell side member 130 may be disposed between the first side member 80 and a lateral side of the back panel 58. The second shell side member 132 may be disposed on the second side member 82 of the seat back frame 54 such that the second shell side member 132 is disposed laterally outboard from the second side member 82. Accordingly, at least a portion of the second shell side member 132 may be disposed opposite the seat back frame opening 88 and the second shell side member 132 may be disposed between the second side member 82 and a lateral side of the back panel 58. The upper shell cross member 134 may be disposed on and may extend across the back side of the upper cross member 84. The lower shell cross member 136 may be disposed on and may extend across a front side of a portion of the lower cross member 86, such as the front side of the rear wall 112.

Referring to FIGS. 3 and 5, one or more side bolster flaps 140 may be pivotally disposed on the shell 56. In the configuration shown, two side bolster flaps 140 are provided. A first side bolster flap 140 may be pivotally disposed on the first shell side member 130. A second side bolster flap 140 may be pivotally disposed on the second shell side member 132. The side bolster flaps 140 may be disposed forwardly with respect to the seat back frame 54. For example, the first and second side bolster flaps 140 may be disposed in front of the first and second side members 80, 82, respectively.

Each side bolster flap 140 may be pivotally disposed on the shell 56. For example, each side bolster flap 140 may be pivotally coupled to the shell 56 with a pivot pin 180. The pivot pin 180 may extend along or define a pivot pin axis about which the side bolster flap 140 pivots or rotates. The pivot pin 180 may be disposed at an end of the side bolster flap 140 that may be disposed closest to the seat back frame 54. In addition, the pivot pin 180 may be disposed along a side or edge of the side bolster flap 140 that is disposed closest to the center or center seating portion of the seat back 14. As such, the side bolster flaps 140 may be configured to pivot toward or away from the center of the seat back 14.

Referring to FIG. 4, each side bolster flap 140 may also include a bladder mounting feature 182. The bladder mounting feature may be configured to couple an inflatable bladder to the side bolster flap 140. In the configuration shown, the bladder mounting feature 182 is disposed proximate the top of the side bolster flap 140 and may have an arrow shaped configuration. The bladder mounting feature 182 may facilitate mounting of an inflatable bladder 62 between the side bolster flap 140 and a corresponding shell side member 130, 132 as will be discussed in more detail below.

Referring to FIGS. 3 and 4, the back panel 58 may form a visible exterior portion of the seat back 14. The back panel 58 may be assembled from multiple components. In at least one embodiment, the back panel 58 may include a center panel 190 and at least one side panel 192. The center panel 190 and the side panels 192 may form or provide an exterior surface of the back panel 58 that may be visible from outside the seat assembly 10. Alternatively, the back panel 58 or a portion thereof may be at least partially concealed under the seat back trim cover 50.

As is best shown in FIG. 3, the center panel 190 may extend across the back side 42 of the seat back 14. The center panel 190 may include one or more back panel mounting brackets 194. The back panel mounting features may be disposed on an interior side of the center panel 190 that faces toward the seat back frame 54. In FIG. 3, two back panel mounting brackets 194 are shown; however, it is contemplated that a greater or lesser number of back panel mounting brackets 194 may be provided in one or more configurations. Each back panel mounting bracket 194 may facilitate mounting of the back panel 58 to the seat back frame 54. In addition, a back panel mounting bracket 194 may help secure or facilitate mounting of the shell 56. For instance, the back panel mounting bracket 194 may extend under the upper cross member 84 of the seat back frame 54 as is best shown in FIG. 4. In addition, the upper shell cross member 134 of the shell 56 may be received in the back panel mounting bracket 194 such that the upper shell cross member 134 may be disposed between the mounting tab 100 of the upper cross member 84 and the back panel 58. The back panel 58 may also include additional back panel mounting features that may couple the back panel to the lower shell cross member 136. Such mounting features may have any suitable configuration. For instance, the back panel mounting features may be configured as snap tabs, hooks or the like that may be pushed into corresponding openings on the lower shell cross member 136 to secure the back panel 58.

Referring to FIGS. 2 and 3, the side panels 192 may extend from opposite ends of the center panel 190 and may wrap around or extend in a forward direction along a portion of the lateral sides 44 of the seat back 14. For instance, a first side panel 192 may extend in a forward direction along one lateral side of the seat back 14 to the first shell side member 130 while a second side panel 192 may extend in a forward direction along another lateral side of the seat back 14 to the second shell side member 132. The side panels 192 may extend from the center panel 190 to the shell 56. In addition, the side panels 192 may be disposed outboard from and may extend around the shell 56. As such, the first shell side member 130 may be disposed between the first side member 80 and a first side panel 192 while the second shell side member 132 may be disposed between the second side member 82 and the second side panel 192. The side panels 192 may be configured to flex to facilitate deployment of a side air bag that may be provided with the seat back 14.

Referring to FIGS. 2 and 3, one or more headrest guide sleeves 60 may be provided with the seat back 14. In the configuration shown in FIGS. 2 and 3, two headrest guide sleeves 60 are provided. The headrest guide sleeves 60 may facilitate mounting of a headrest 200, which is shown in FIG. 1. The headrest 200 may be configured to support the head of an occupant of the seat assembly 10. For example, a headrest guide sleeves 60 may receive a support post that may extend from a headrest 200.

As is best shown in FIG. 2, headrest guide sleeves 60 may extend through the top of the seat back cushion 52. In addition, the headrest guide sleeve 60 may be received in a guide sleeve opening 96 in the upper cross member 84 of the seat back frame 54 as is best shown in FIG. 3. For instance, the headrest guide sleeves 60 may extend from the upper wall 90 to the lower wall 92 of the upper cross member 84. A headrest guide sleeve 60 may be fixedly disposed on the upper cross member 84 or may be fixedly positioned with respect to the upper cross member 84 in one or more configurations. The headrest guide sleeves 60 may be spaced apart from and may not engage the shell 56 and the back panel 58.

Referring to FIGS. 3 and 4, one or more inflatable bladders 62 may be provided with the seat back 14. An inflatable bladder 62 may be used to actuate the side bolsters 70 of the seat back cushion 52. For example, an inflatable bladder 62 may be associated with each side bolster flap 140. The inflatable bladder 62 may be disposed between the shell 56 and the side bolster flap 140.

The inflatable bladder 62 may be mounted to the side bolster flap 140 in any suitable manner. For example, inflatable bladder 62 may have a bladder opening 210 that may receive the bladder mounting feature 182 of the side bolster flap 140. The bladder opening 210 may be configured as a through hole in one or more embodiments. The bladder mounting feature 182 may include one or more hooks or barbs that may help retain the inflatable bladder 62 on the side bolster flap 140. Each inflatable bladder 62 may be substantially air impermeable.

An inflatable bladder 62 may be inflated or deflated to pivot the side bolster flap 140 about an associated pivot pin 180. For instance, pressurized gas may be supplied to the inflatable bladder 62 to inflate the inflatable bladder 62, thereby causing the side bolster flap 140 to pivot or rotate about its associated pivot pin 180 toward the center of the seat back 14. In turn, the side bolster flap 140 may actuate the side bolster 70 of the seat back cushion 52 toward the center of the seat back 14 or toward a seat occupant. Conversely, pressurized gas may be vented from an inflatable bladder 62 to deflate the inflatable bladder 62, thereby causing the side bolster flap 140 to pivot or rotate about its associated pivot pin 180 away from the center of the seat back 14. In response, the side bolster flap 140 and an associated side bolster 70 of the seat back cushion 52 may move away from the center of the seat back 14.

Referring to FIG. 3, the pressurized gas source 64 may provide an inflation gas to the inflatable bladders 62 to inflate the inflatable bladder 62. Pressurized gas source 64 may have any suitable configuration. For example, the pressurized gas source 64 may be a pump, storage tank, or combinations thereof. The pressurized gas source 64 may be disposed on the shell 56. For example, the pressurized gas source 64 may be received in the mounting cavity 170 of the shell 56. Moreover, the pressurized gas source 64 may be spaced apart from and may not engage the seat back frame 54. The pressurized gas source 64 may be fluidly connected to one or more inflatable bladders 62 in any suitable manner, such as with a conduit like a hose or tube. One or more valves may be associated with the pressurized gas source 64 to route pressurized gas to an inflatable bladder 62 or vent gas from an inflatable bladder 62 in one or more embodiments. An electronic controller may control operation of the valves and the pressurized gas source 64.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
a seat back that includes:
a seat back frame that has first and second side members that extend from an upper cross member to a lower cross member; and
a shell that has first and second shell side members that extend from an upper shell cross member to a lower shell cross member to define a shell opening;
wherein the seat back frame extends through the shell opening such that the upper shell cross member is disposed on a back side of the upper cross member and the lower shell cross member is disposed on a front side of the lower cross member that is disposed opposite the back side.

2. The seat assembly of claim 1 further comprising a back panel that is disposed opposite a seat back cushion, wherein the shell extends from the back panel to the seat back frame.

3. The seat assembly of claim 2 wherein the upper shell cross member extends from the back panel to the upper cross member.

4. The seat assembly of claim 3 wherein the lower cross member extends from the back panel to the lower shell cross member.

5. The seat assembly of claim 2 wherein the back panel has first and second side panels that extend along opposite lateral sides of the seat back to the first and second shell side members, respectively.

6. The seat assembly of claim 5 wherein the first shell side member extends from the first side member of the seat back frame to the first side panel of the back panel and the second shell side member extends from the second side member of the seat back frame to the second side panel of the back panel.

7. The seat assembly of claim 1 wherein the first and second shell side members at least partially define first and second side bolsters of the seat back.

8. The seat assembly of claim 1 wherein the first and second shell side members are disposed on the first and second side members of the seat back frame such that the first side member is at least partially received in a frame receiving pocket of the first shell side member and the second side member is at least partially received in a frame receiving pocket of the second shell side member.

9. A seat assembly comprising:
a seat bottom; and
a seat back that is rotatable about an axis with respect to the seat bottom, the seat back including:
a seat back frame that includes first and second side members that extend from an upper cross member to a lower cross member;
a shell that has first and second shell side members that extend from an upper shell cross member to a lower shell cross member to define a shell opening, wherein the lower shell cross member is disposed above the axis; and
a seat back cushion that is disposed on the shell;
wherein the seat back frame extends through the shell opening such that the upper shell cross member is disposed on a back side of the upper cross member and the lower shell cross member is disposed on a front side of the lower cross member that is disposed opposite the back side.

10. The seat assembly of claim 9 wherein the lower cross member has a tubular portion that is at least partially disposed below the axis and a rear wall that extends from the tubular portion toward the upper cross member, wherein the lower shell cross member is disposed above the tubular portion and between the seat back cushion and the rear wall.

11. The seat assembly of claim 9 wherein the seat back has a back panel that is disposed opposite the seat back cushion, wherein the back panel has a back panel mounting bracket that receives the upper shell cross member and extends under the upper cross member to secure the back panel to the seat back frame.

12. The seat assembly of claim 9 wherein the upper cross member has an upper wall that receives a headrest guide sleeve that facilitates mounting of a headrest, wherein the upper wall extends over the upper shell cross member.

13. The seat assembly of claim 12 wherein the headrest guide sleeve is spaced apart from and does not engage the shell.

14. The seat assembly of claim 9 wherein the upper shell cross member has a mounting feature that extends through the upper cross member of the seat back frame.

15. A seat assembly comprising:
a seat back that includes:
a seat back frame;
a shell that encircles the seat back frame, the shell having a shell opening through which the seat back frame extends;
a side bolster flap that is pivotally disposed on the shell; and
an inflatable bladder that is disposed between the shell and the side bolster flap, wherein the side bolster flap pivots with respect to the shell and the seat back frame when the inflatable bladder is inflated.

16. The seat assembly of claim 15 wherein the shell has first shell side member that extends from an upper shell cross member to a lower shell cross member, wherein the side bolster flap is disposed on the first shell side member.

17. The seat assembly of claim 16 wherein the lower shell cross member defines a mounting cavity that receives a pressurized gas source that provides pressurized gas to the inflatable bladder.

18. The seat assembly of claim 17 wherein the pressurized gas source is spaced apart from and does not engage the seat back frame.

19. The seat assembly of claim 15 wherein the inflatable bladder is mounted to the side bolster flap.

20. The seat assembly of claim 19 wherein the side bolster flap has a bladder mounting feature that extends through an opening in the inflatable bladder.

* * * * *